United States Patent [19]

Yamada

[11] Patent Number: 5,213,910
[45] Date of Patent: May 25, 1993

[54] SOLID ELECTROLYTE TYPE FUEL CELL HAVING GAS FROM GAS SUPPLY DUCTS IMPINGING PERPENDICULARLY ON ELECTRODES

[75] Inventor: Hirotake Yamada, Nagoya, Japan
[73] Assignee: NGK Insulators, Ltd., Japan
[21] Appl. No.: 852,521
[22] Filed: Mar. 17, 1992
[30] Foreign Application Priority Data
Mar. 20, 1991 [JP] Japan .................... 3-80629
[51] Int. Cl.$^5$ .................... H01M 8/12; H01M 4/86
[52] U.S. Cl. .................... 429/32; 429/34; 429/39; 429/41
[58] Field of Search .................... 429/39, 38, 34, 41, 429/32, 40

[56] References Cited

U.S. PATENT DOCUMENTS

| | | | |
|---|---|---|---|
| 3,297,485 | 1/1967 | Tocker | 429/39 X |
| 3,432,357 | 3/1969 | Dankese | 429/34 |
| 3,565,691 | 2/1971 | Strier et al. | 429/41 X |
| 4,499,663 | 2/1985 | Zwick et al. | 429/32 X |
| 4,728,584 | 3/1988 | Isenberg | 429/34 X |
| 4,943,495 | 7/1990 | Okada et al. | 429/39 X |

*Primary Examiner*—John S. Maples
*Attorney, Agent, or Firm*—Parkhurst, Wendel & Rossi

[57] ABSTRACT

A solid electrolyte type fuel cell for generating electric power. The solid electrolyte type fuel cell includes two plate-shaped solid electrolyte type fuel cell elements formed with a plurality of recesses and a gas supply member for supplying an electric power generating gas to the fuel cell. The gas supply member is provided with gas supply openings for the electric power generating gas and arranged between the plate-shaped solid electrolyte type fuel cell elements so that the gas supply openings open in the recesses. When the electric power generating gas is supplied into the recesses from the gas supply openings, the streams of the electric power generating gas impinge against electrodes exposed in the recesses so as to turn their flowing directions to cause the streams to flow along surfaces of the electrodes. As a result, the temperature distribution in the fuel cell becomes uniform so that the electric power generating efficiency can be improved.

10 Claims, 7 Drawing Sheets

FIG_3

FIG._4

SOLID ELECTROLYTE TYPE FUEL CELL HAVING GAS FROM GAS SUPPLY DUCTS IMPINGING PERPENDICULARLY ON ELECTRODES

BACKGROUND OF THE INVENTION

1. Field of the Invention

The present invention relates to a solid electrolyte type fuel cell.

2. Description of the Prior Art

Recently, fuel cells have been noted as power generating devices. The fuel cell is a device capable of directly converting chemical energy included in a fuel to electrical energy. As the fuel cell is free from limitation of Carnot's cycle, the cell is a very promising technique because of its inherently high energy conversion efficiency, wide latitude of fuels to be used (naphtha, natural gas, methanol, coal reformed gas, heavy oil and the like), less public nuisance, and high electrical power generating efficiency without being affected by the scale of installation.

Particularly, as the solid electrolyte type fuel cell (referred to as "SOFC" hereinafter) operates at high temperatures such as 1,000° C., activity of electrodes is very high. Moreover, the SOFC has low polarization and relatively high output voltage without requiring any catalyst of an expensive noble metal such as platinum so that energy conversion efficiency is much higher than those of the other fuel cells. Furthermore, the SOFC is stable and has long service life because all the constituent materials of the SOFC are solid.

One example of such solid electrolyte type fuel cells is illustrated in the partial front view of FIG. 1 and partial perspective view of FIG. 2. This is a SOFC of a monolithic design, referred to as "Co-flow Model" of Argonne type which was initially proposed by the Argonne National Laboratory.

In the SOFC of this type, as shown in FIG. 1, a flat plate-shaped air electrode film 44, an interconnector 43 and a flat plate-shaped fuel electrode film 42 are laminated from above to below to form each of flat plate-shaped laminates 41. The plate-shaped laminates 41 are then arranged in parallel with one another with a predetermined interval. A number of fuel electrode films 52 having a substantially V-shaped section as shown in the drawing are arranged in opposition to the flat plate-shaped fuel electrodes 42 to form a number of fuel gas passages 20 perpendicular to the surface of the drawing of FIG. 1. Moreover, a number of air electrode films 54 having an inverted V-shaped section are provided in opposition to the flat plate-shaped air electrode films 44 to form a number of oxidizing gas passages 30 in the same direction of the fuel gas passages 20.

These fuel gas passages 20 and the oxidizing gas passages 30 are combined with one another in the form of a mosaic so that wave-shaped solid electrolyte films 53 are formed between the fuel electrode films 52 and the air electrode films 54. With this arrangement, between the adjacent fuel gas passages 20 and oxidizing gas passages 30 there are interposed the fuel electrode films 52, the wave-shaped solid electrolyte films 53 and the air electrode films 54 in this order. The power generation is performed in these interposed films. Although the films participating in the power generation are shown only in one row for the sake of simplicity in FIG. 1, a number of laminates shown in the drawing are laminated to form a number of gas passages in the form of a honeycomb.

In generating electric power, a fuel gas is supplied into the inlets of the fuel gas passages 20 as shown by arrows C in FIG. 2. The fuel gas flows through the fuel gas passages 20 and are exhausted from the outlets of the fuel gas passages 20 as shown by arrows D. At the same time, an oxidizing gas is caused to flow through the oxidizing gas passages 30 as shown by arrows E. The oxidizing gas and the fuel gas flow in opposite directions, respectively. In FIG. 2, the respective electrode films and the laminated components such as the inter connectors shown in FIG. 1 are not shown for the sake of clarity.

With such a SOFC described above, there has been a problem of steep temperature gradient due to concentration gradient of fuel gas streams. In more detail, when the fuel gas flows into the fuel gas passages 20, a relatively large amount of fuel is consumed for the electrochemical reaction to raise the temperature in the proximity of the inlets of the fuel gas passages 20 because the fuel gas contains yet abundant amounts of the fuel near the inlets. As a result, the electrochemical reaction of the fuel with oxygen ions at the fuel electrode films 52 is more and more activated by the temperature rise.

On the other hand, the fuel gas flowing through the fuel gas passages 20 reduces its fuel concentration as the fuel gas approaches the outlets of the fuel gas passages 20 so that the amount of the fuel consumed in the electrochemical reaction progressively reduces. Therefore, the temperature of the fuel electrode films 52 does not rise sufficiently and hence the electrochemical reaction becomes more inactive. Moreover, the fuel gas of the reduced concentration includes fairly large amounts of $CO_2$, moisture and the like which would attach to the surfaces of the fuel electrode films 52 to impede the electrochemical reaction thereat, so that the reaction becomes more and more inactive.

Consequently, steep temperature gradient is caused between the upstream side and the downstream side of the fuel gas. When the SOFC is operated in such a steep temperature gradient for a long period of time, cracks tend to occur in walls of the passages and electric power generating efficiency itself is detrimentally affected.

While the problems of the monolithic type SOFC have been explained, the same holds true in the conventional flat plate type SOFC.

SUMMARY OF THE INVENTION

It is an object of the invention to provide a solid electrolyte type fuel cell whose fuel concentration gradient and oxidizing agent concentration gradient are made as small as possible to reduce difference in temperature throughout of the fuel cell caused thereby to solve the problems of the prior art.

In order to accomplish this object, the solid electrolyte type fuel cell according to the invention comprises plate-shaped solid electrolyte type fuel cell elements formed with a plurality of recesses, and a gas supply member supplying an electric power generating gas to the cell elements and provided with electric power generating gas supply openings opening in the recesses so that streams of the electric power generating gas supplied into the recesses from the gas supply openings impinge against electrodes exposed in the recesses so as to turn their flowing directions to cause the streams to flow along surfaces of the electrodes.

The term "electric power generating gas" used herein is intended to designate a fuel gas or an oxidizing gas. The "fuel gas" referred herein means a gas including a fuel such as hydrogen, reformed gas, carbon monoxide or the like, while the "oxidizing gas" means a gas including an oxidizing agent such as oxygen, hydrogen peroxide or the like.

If the "electric power generating gas" is a fuel gas, the "electrode" is a fuel electrode. On the other hand, if the "electric power generating gas" is an oxidizing gas, the "electrode" is an air electrode.

The solid electrolyte type fuel cell according to the invention is so constructed that a gas for generating electric power is supplied into the recesses from the gas supply openings opening therein so as to impinge against electrodes covering the recesses to change the flowing direction in order to cause the gas to flow along the surfaces of the electrodes. Therefore, the fresh gas for generating electric power is always supplied directly to each of the plural recesses formed in the plate-shaped solid electrolyte type fuel cell elements.

According to the invention, therefore, the electrochemical reaction is made uniform all over the fuel electrodes or air electrodes covering the recesses without causing electric power generating gases having reduced concentration of fuel or oxidizing agent to flow along gas passages for long distances as in the prior art. Consequently, the temperature gradient at the fuel electrode or air electrode becomes small. As a result, according to the invention there is no tendency for cracks to occur in the SOFC even if the SOFC is operated for a long period of time, and the electric power generating efficiency can also be improved as a whole.

The invention will be more fully understood by referring to the following detailed specification and claims taken in connection with the appended drawings.

Figure 1:
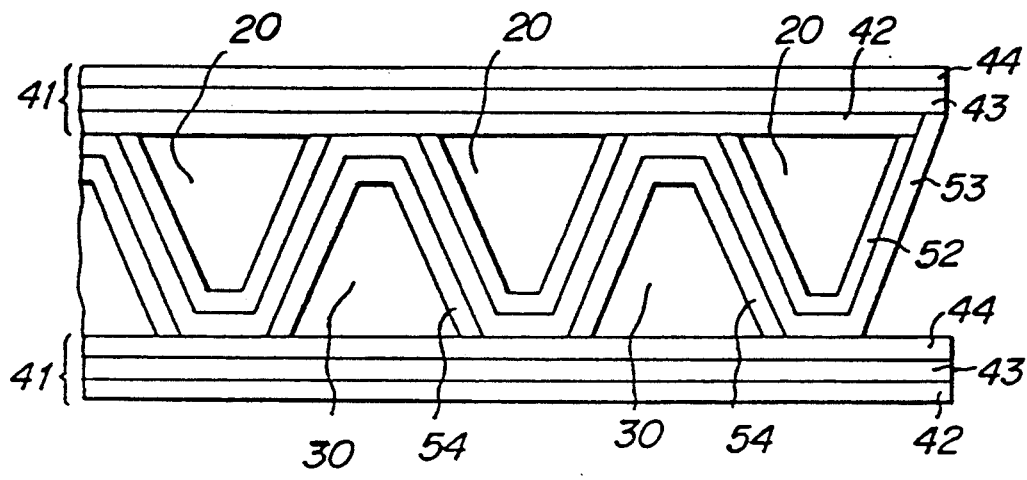
FIG. 1 is a partial front view illustrating a monolithic type SOFC of the prior art.

In the drawings, the following reference numerals identify the following elements:

1, 11, 21, 31 . . . SOFC elements
2, 12, 22, 32, 42, 52 . . . fuel electrode films
3, 13, 23, 33, 53 . . . solid electrolyte films
4, 14, 24, 34, 44, 54 . . . air electrode films
5, 15, 25, 35 . . . recesses
7 . . . projection for supplying fuel
7a, 17a . . . fuel gas supply openings
9, 19 . . . fuel gas supply member for supplying fuel gas
10 . . . connection
17 . . . cylindrical supply tube
28, 38, 48, 58 . . . projections
29 . . . flat plate-shaped portion
A, B, C, D . . . flowing directions of fuel gas
E, J . . . flowing directions of oxidizing gas

DESCRIPTION OF THE PREFERRED EMBODIMENTS

Figure 3:
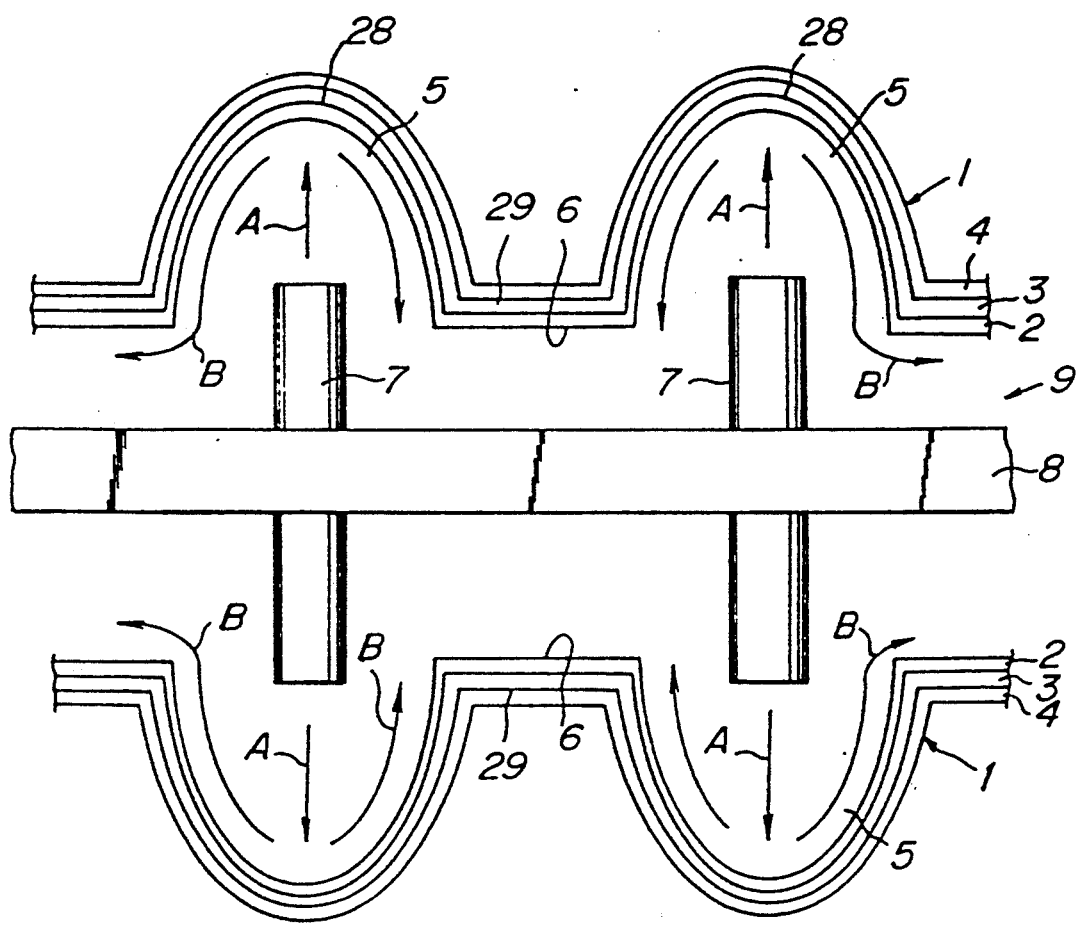
FIG. 3 is a partial front view illustrating a SOFC of one embodiment according to the invention.
Figure 4:
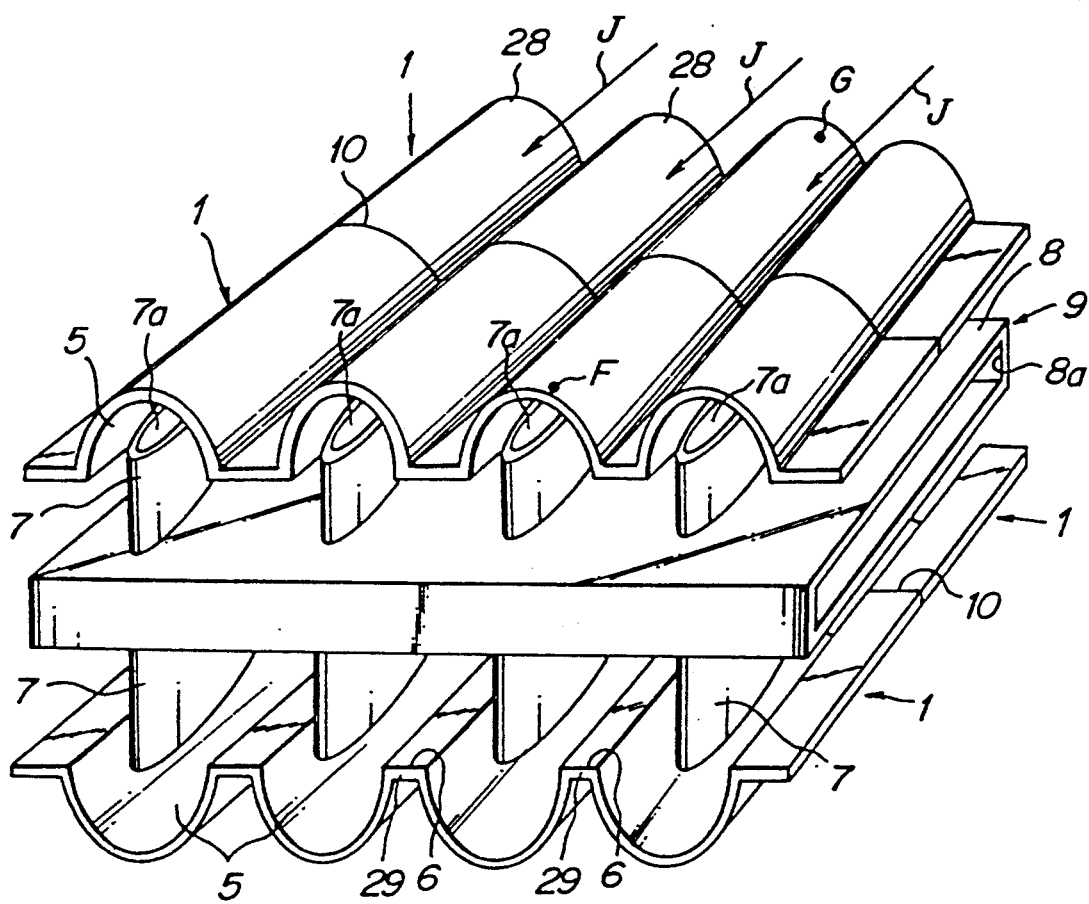
FIG. 4 is a schematic perspective view illustrating the SOFC shown in FIG. 3.
Figure 5:
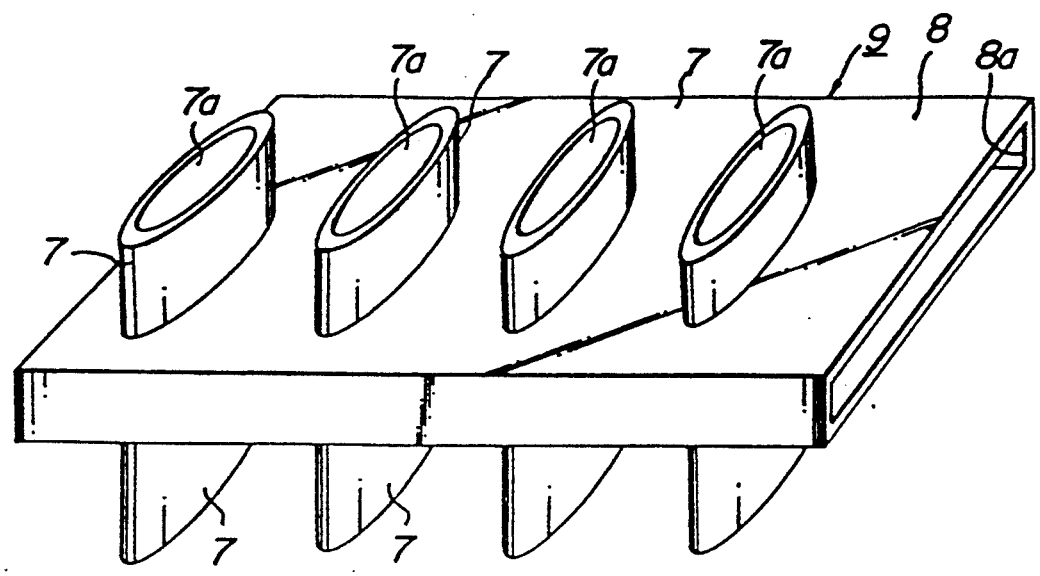
FIG. 5 is a perspective view illustrating a fuel gas supply member of the SOFC shown in FIG. 3.

The SOFC according to one embodiment of the invention is shown in the fragmentary front view of FIG. 3 and the general perspective view of FIG. 4, whose fuel gas supply member 9 is shown in the perspective view of FIG. 5. First, the plate-shaped SOFC element 1 used in the present embodiment will be explained.

The SOFC element 1 is rectangular in a plane and is provided with a plurality (four in the shown embodiment) of projections 28 having a substantially semicircular section and arranged regularly with a predetermined interval. With the arrangement, flat plate-shaped portions 29 rectangular in a plane are formed between the projections 28.

According to the shown embodiment, by connecting side edges of two SOFC elements 1, they are connected in series with each other. The connection 10 will be explained in detail latter. After, for example, two sets of SOFC elements have been in connected series to each other in this manner, the two sets of SOFC elements thus connected are arranged in opposition to and in parallel with each other and spaced a predetermined distance from each other so that the projections 28 are facing outwardly and recesses 5 of the upper and lower SOFC elements 1 are opposed to each other and the flat plate-shaped portions 29 of the upper and lower SOFC elements 1 are opposed to each other as shown in FIGS. 3 and 4.

As shown in FIG. 3, each of the SOFC elements 1 is a laminate formed by a fuel electrode film 2, a solid electrolyte film 3 and an air electrode film 4. In FIG. 4, however, the laminated construction is not shown for the sake of clarity. The recess 5 formed in the inside of each of the projections 28 forms a long space having a substantially semicircular cross-section. In the recess 5, the fuel electrode film 2 is directly exposed which has also a substantially semicircular cross-section in this portion. With each of the flat plate-shaped portions 29 formed between the projections 28, the fuel electrode film 2 forms a flat surface 6.

The fuel supply member 9 will be explained by referring to FIG. 5. The plate-shaped main body 8 is hollow and is provided with a rectangular opening 8a at its one side surface. The main body 8 is provided on its two main surfaces with a plurality of protrusions 7, four protrusions on each main surface in the shown embodiment. Each of the protrusions 7 is in the form of a substantially parallelepiped whose both ends are somewhat tapered off and has at the free end a slit-shaped fuel gas supply opening 7a. As shown in FIG. 5, the somewhat long protrusions 7 are arranged in a row and in parallel with one another.

Figure 6:
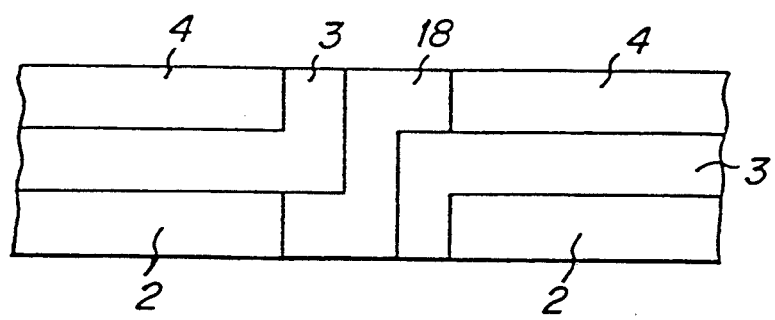
FIG. 6 is a fragmentary front elevation illustrating a connection of two SOFC elements shown in FIG. 4.

The construction of the connection 10 between the two adjacent SOFC elements 1 is shown in FIG. 6. As shown in FIG. 6, the fuel electrode film 2 of the SOFC element on the left side is connected to an interconnector 18 which is insulated from the air electrode film 4 by the solid electrolyte film 3. Moreover, the interconnector 18 is connected to the air electrode film 4 of the SOFC element on the right side in FIG. 6 and is insulated from the fuel electrode film 2 by the solid electrolyte film 3 of the SOFC element on the right side.

The whole SOFC operates in the following manner. After the SOFC elements have been arranged opposed to each other with a predetermined distance, in the space between which the fuel gas supply member 9 is arranged such that the plate-shaped main body 8 assumes substantially at the mid position between the opposed SOFC elements 1 and the free ends of the respective protrusions 7 assume in the recesses 5. The free ends of the protrusions 7 are preferably in opposition to the deepest portions of the recesses 5.

When a fuel gas is supplied into the opening 8a of the plate-shaped main body 8, the fuel gas flows through the cavity in the main body 8 and substantially uniformly flows out of all the eight fuel gas supply openings 7a shown by arrows A in FIG. 3. The fuel gas streams thus supplied from the fuel gas supply openings 7a into the recesses 5 impinge against the fuel electrode films 2 exposed in the recesses 5 of the upper and lower SOFC elements. Therefore, the fuel gas streams flow along the surfaces of the fuel electrode film 2 in the recesses 5 and then flow along the flat surfaces 6.

On the other hand, when an oxidizing gas is caused to flow along the surfaces of the air electrode films 4 as shown by arrows J, the oxidizing gas produces oxygen ions at interfaces between the air electrode films 4 and the solid electrolyte films 3. The oxygen ions then move through the solid electrolyte films 3 into the fuel electrode films 2 so that the oxygen ions react on the fuel and give off electrons into the fuel electrode films 2.

The SOFC is utilized for electric current generation in this manner. The fuel gas and the oxidizing gas which have been reduced in their concentrations are fed to flow to a waste gas combustion chamber (not shown) where they are mixed with each other and burned.

The air electrode film 4 may be made of a conductive perovskite type oxide such as $LaMnO_3$, $CaMnO_3$, $LaNiO_3$, $LaCoO_3$, $LaCrO_3$ or the like which is doped or not. Among them, $LaMnO_3$ doped with strontium is preferable for the air electrode film 4. Moreover, the solid electrolyte film 3 is preferably made of zirconia completely or partially stabilized with yttria. On the other hand, the fuel electrode film 2 is generally preferably made of nickel-zirconia cermet or cobalt-zirconia cermet. The interconnector 18 is preferably made of perovskite type $LaCrO_3$, $LaMnO_3$ or the like which is doped or not.

The fuel gas supply member 9 is formed by a heat resistant metal or ceramic material which is resistant to the fuel gas used in the operation of the SOFC and stable at the operating temperatures of the SOFC. For example, preferable is Ni-Cr, Ni-Fe-Cr, Ni-Fe-Cr-Al, Co-Ni-Cr, Fe-Cr, Fe-Cr-Al alloy or the like having each of compositions.

According to the embodiment, the fuel gas is supplied into the recesses 5 from the fuel gas supply openings 7a opening therein so that the fuel gas impinges against the fuel electrode films 2. Therefore, streams of the fuel gas change their flowing directions to flow along the surfaces of the fuel electrode films 2 shown by the arrows B in FIG. 3, with the result that the fresh and fuel-abundant gas is always supplied throughout the recesses 5 and the flat surfaces 6. Therefore, no fuel gas of reduced fuel concentration flows through a long distance in the DOFC according to the invention different from that of the prior art. Accordingly, the electrochemical reaction can be effected uniformly all over the fuel electrode films 2 so that the temperature gradient of the fuel electrode films 2 is reduced. As a result, according to the invention it is possible to prevent cracks or the like in operation of the SOFC for a long time and to avoid the lowering of electric power generating efficiency by virtue of the uniform electrochemical reaction.

Moreover, as the fuel gas supply openings 7a are formed in the form of a long slit, the fuel gas can be uniformly supplied in the lengthwise directions of the openings 7a without any local unevenness. Therefore, the fresh fuel gas can be supplied into the recesses 5 more uniformly in the lengthwise directions of the recesses 5.

While the two plate-shaped SOFC elements are connected to each other in the multicell type connecting method as shown in FIG. 6, more than two plate-shaped SOFC elements may be successively connected with one another in the same manner to obtain high voltage electric power. Further, the number of the projections 28 arranged from the left to the right viewed in FIGS. 3 and 4 may be increased to generate higher electric power.

Figure 7:
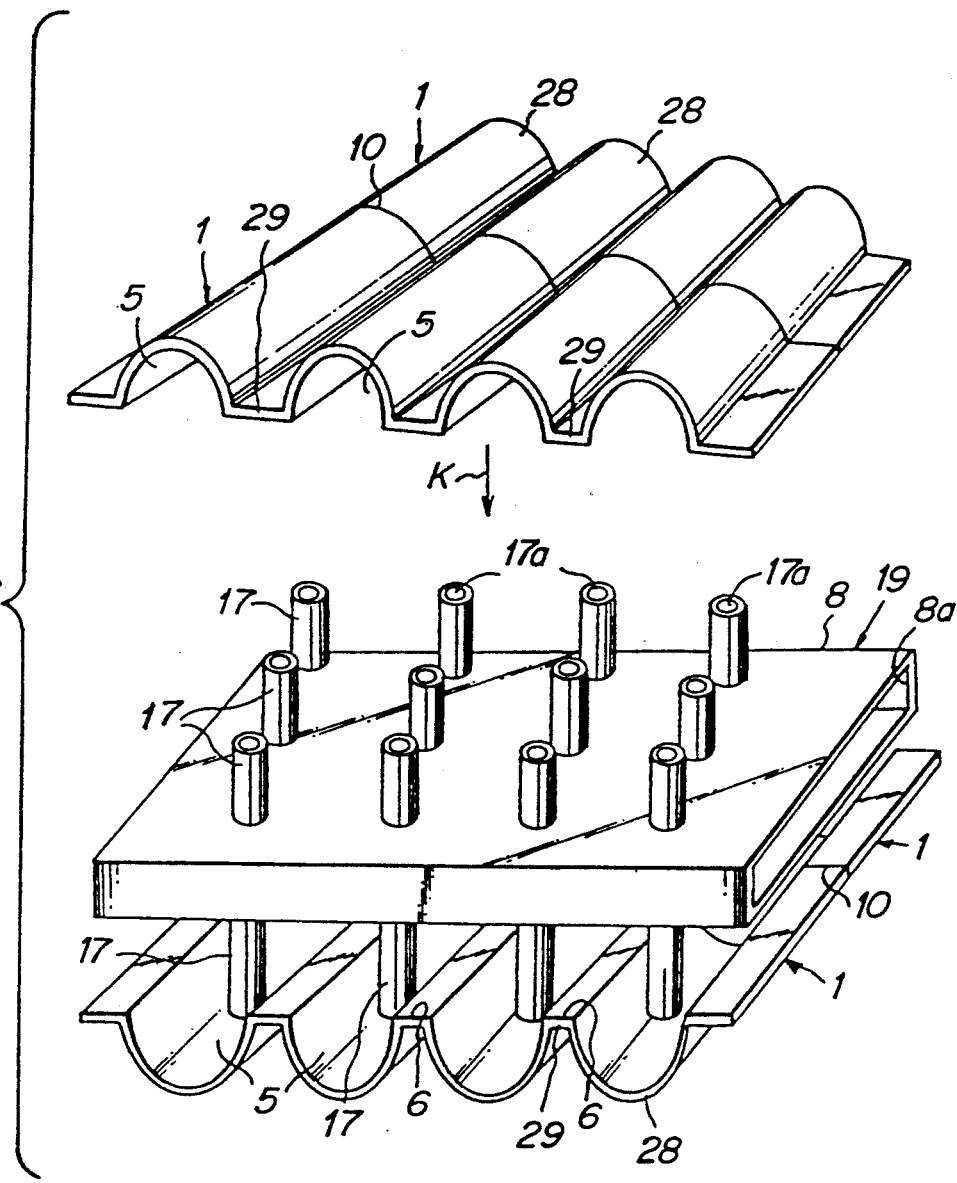
FIG. 7 is a partial exploded perspective view illustrating a SOFC of another embodiment according to the invention.

The SOFC of another embodiment according to the invention is shown in a partially exploded perspective view of FIG. 7. The like components are designated by the same reference numerals as those in FIG. 3 and will not be described in further detail. The SOFC is similar to that shown in FIG. 3 with exception of the fuel gas supply member 19. The laminated construction of the SOFC is not shown in FIG. 7 in the same reason as in FIG. 4.

The plate-shaped main body 8 is provided on each of main surfaces with cylindrical supply tubes or cylindrical protrusions 17, for example, in three rows and four columns. The SOFC element 1 is moved in the direction shown by an arrow K and fixed at a predetermined position so that the free ends of the cylindrical supply tubes 17 are positioned in recesses 5, respectively. In this state, a fuel gas is supplied from the fuel gas supply openings 17a into the recesses 5. The streams of the fuel gas impinge against the fuel electrode films exposed in the recesses 5 to change their flowing directions and then flow along the surfaces of the fuel electrode films in the same manner as in the first embodiment.

The same effects as in the first embodiment can also be obtained in this embodiment. However, it is more preferable that the cylindrical supply tubes 17 are arranged spaced by equal distances from one another in order to supply the fuel gas uniformly all over the surfaces of the fuel electrode films.

Figure 8:
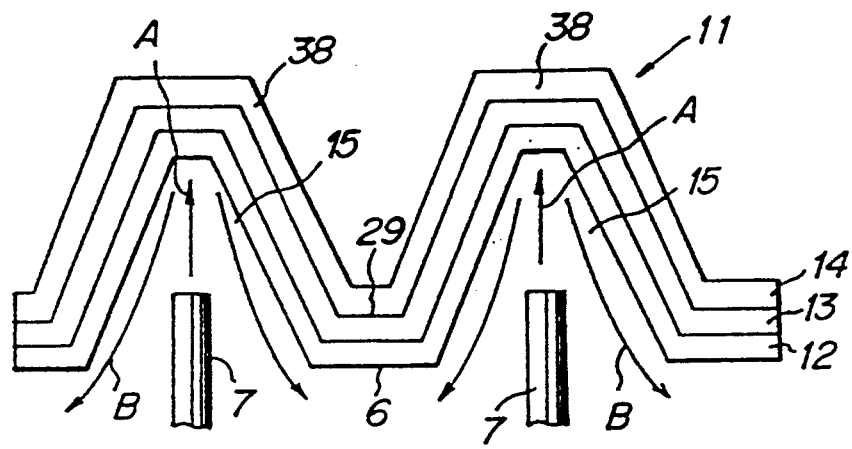
FIG. 8 is a partial front view illustrating one different example of the SOFC according to the invention.
Figure 9:
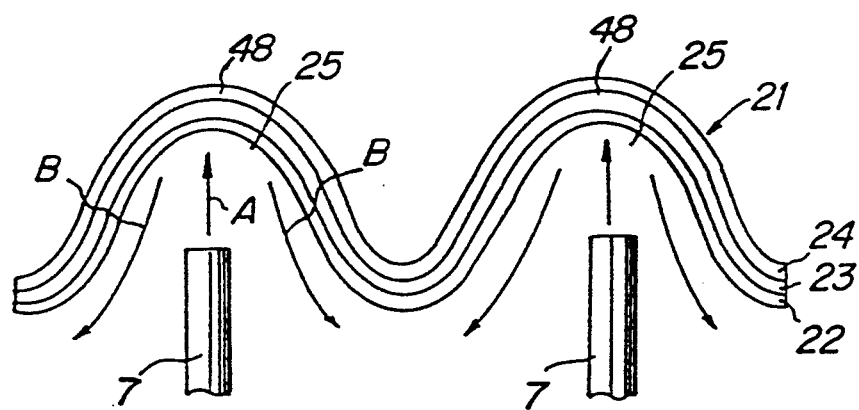
FIG. 9 is a partial front view illustrating another example of the SOFC according to the invention.
Figure 10:
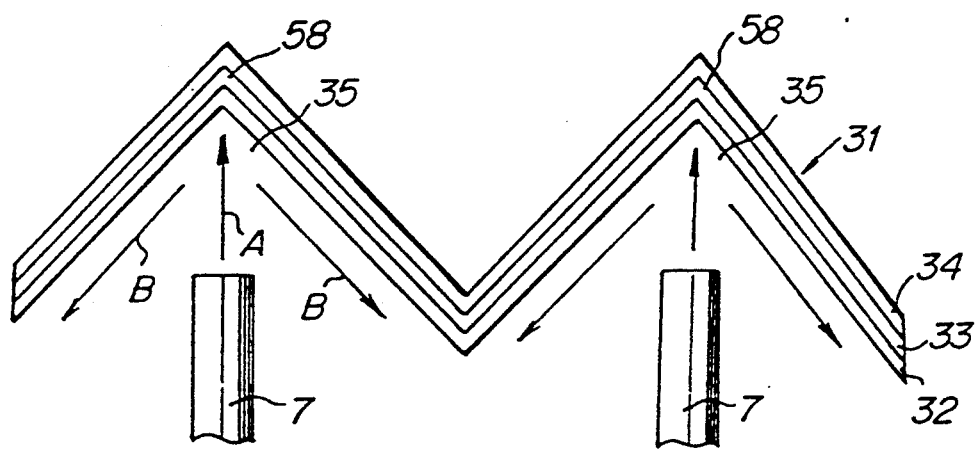
FIG. 10 is a partial front view illustrating further example of the SOFC according to the invention.

FIGS. 8 to 10 partially illustrate in front elevations SOFC elements of other embodiments according to the invention.

The SOFC element 11 shown in FIG. 8 is of a three layer structure consisting of a fuel electrode film 12, a solid electrolyte film 13 and an air electrode film 14. The SOFC element 11 is provided with projections 38 having a trapezoid cross-section and regularly arranged with a predetermined interval in the direction from the left to the right in FIG. 8. Flat plate portions 29 are formed between the adjacent projections 38, while recesses 15 are formed on the side of the fuel electrode film 12 in the projections 38. The free ends of protrusions 7 similar to those in the first embodiment are positioned in the recesses 15.

When a fuel gas is supplied from the fuel supply openings of the protrusions 7 into the recesses 15 shown by arrows A, the streams of the fuel gas streams impinge against the narrow flat portions at the bottoms of the recesses 15 to change their flowing directions and flow along the surfaces of the fuel electrode film 12 shown by arrows B.

The SOFC element 21 shown in FIG. 9 is also of a three layer structure consisting of a fuel electrode film 22, a solid electrolyte film 23 and an air electrode film 24. The SOFC element 21 is provided with projections 48 having a section similar to a semicircle continuously arranged from the left to the right in FIG. 9 to form as a whole a wave-shaped element. Recesses 25 are formed on the side of the fuel electrode film 22 in the projections 48. Other portions are similar to those in FIG. 8, but there are no flat plate-shaped portions 29 in FIG. 8.

The SOFC element 31 shown in FIG. 10 is also of a three layer structure consisting of a fuel electrode film 32, a solid electrolyte film 33 and an air electrode film 34. The SOFC element 31 is provided with projections 58 having a triangular cross-section continuously arranged from the left to the right in FIG. 10. The SOFC element 31 is zigzag in section as a whole. Recesses 35 having an isosceles triangular section are formed on the side of the fuel electrode film 32 in the projections 58. A fuel gas supplied into the recesses 35 impinges against bottom lines of the triangular recesses 35 and then flows comparatively linearly as shown by arrows A.

In the embodiments shown in FIGS. 8 to 10, the number of the projections 38, 48 or 58 may be selected at will. The connection between the SOFC elements 11, 21 or 31 may be carried out as shown in FIG. 6. The cross-sectional shape of the recesses may be polygon having sides more than five or the recesses may be formed as a whole a cycloid curve or a sine curve.

While the plate-shaped SOFC elements are horizontally arranged in the above embodiments, they may be vertically arranged. Moreover, although the fuel gas is supplied onto the side of the fuel electrode film in the above embodiments, those described above may be used in the case that an oxidizing gas is supplied into recesses exposing air electrode films.

Figure 2:
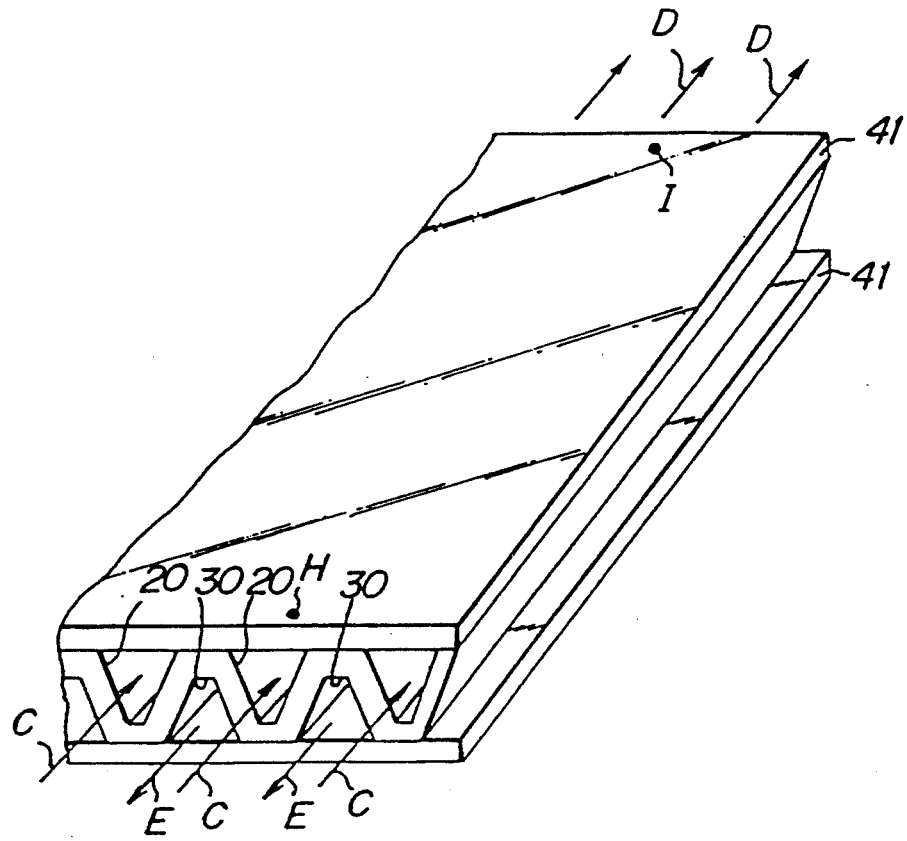
FIG. 2 is a partial perspective view of the SOFC shown in FIG. 1.

An experiment was effected on the SOFC according to the invention shown in FIG. 4 and the SOFC of the prior art shown in FIG. 2. Temperatures at points F, G, H and I on the SOFC were measured. Both the distances between the points F and G and between the points H and I were 500 mm. A fuel gas and an oxidizing gas at 1,000° C. were supplied as described above.

The fuel gas had a composition of 96% hydrogen and 4% water vapor and was supplied to the SOFC at a flow rate per unit area of the elements of $2.8 \times 10^{-4}$ l/sec.cm$^2$. The oxidizing gas was the air and supplied to the SOFC at a flow rate per unit area of the elements of $16.8 \times 10^{-4}$ l/sec.cm$^2$. The following results were obtained.

| | |
|---|---|
| Point F | 1050° C. |
| Point G | 1070° C. |
| Point H | 1210° C. |
| Point I | 930° C. |

From the results, it was clear that the temperature difference or temperature gradient in the SOFC element according to the invention shown in FIG. 4 was very small and hence the temperature distribution was uniform.

On the other hand, electric voltage outputs per unit area of the SOFC were measured. They were 0.11 W/cm$^2$ in case of the SOFC according to the invention shown in FIG. 4 and 0.09 W/cm$^2$ in case of the SOFC of the prior art shown in FIG. 2. It was clearly evident that the electrochemical reaction was uniform in the SOFC according to the invention and consequently electric power output per unit area was increased.

As can be seen from the above description, the temperature distribution is uniform in the SOFC according to the invention. As a result, according to the invention there is no tendency for cracks to occur in the SOFC even if the SOFC is operated for a long period of time, and the electric power generating efficiency can also be improved as a whole.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A solid electrolyte fuel cell comprising:
   at least one plate-shaped solid electrolyte fuel cell element having a plurality of recesses formed therein; and
   a gas supply member for supplying an electric power generating gas to the fuel cell element, and provided with a plurality of electric power generating gas supply ducts which open into the recesses so that streams of electric power generating gas supplied into the recesses from said gas supply ducts initially impinge substantially perpendicularly against electrodes of the fuel cell element exposed in the recesses, so as to turn initial flowing directions of the streams and thus cause flow thereof along surfaces of the electrodes.

2. The solid electrolyte fuel cell of claim 1, wherein each of said at least one plate-shaped solid electrolyte fuel cell element is provided with a plurality of projections having a substantially semicircular cross-section and arranged at an interval to from said recesses on inner sides of said projections and to form flat plate-shaped portions between adjacent projections.

3. The solid electrolyte fuel cell of claim 1, wherein each of said at least one plate-shaped solid electrolyte fuel cell element is provided with a plurality of projections having a substantially trapezoidal cross-section and arranged at an interval to form said recesses on inner sides of said projections and to form flat plate-shaped portions between adjacent projections.

4. The solid electrolyte fuel cell of claim 1, wherein each of said at least one plate-shaped solid electrolyte fuel cell element is provided with a plurality of projections having a cross-section similar to a semicircle and arranged at an interval to form said recesses on inner sides of said projections so that the plate-shaped solid electrolyte fuel cell element is wave-shaped as a whole.

5. The solid electrolyte fuel cell of claim 1, wherein each of said at least one plate-shaped solid electrolyte fuel cell element is provided with a plurality of projections having a triangular cross-section and arranged at an interval to form said recesses on inner sides of said projections so that the plate-shaped solid electrolyte fuel cell element is zigzag in cross-section as a whole, and said electric power generating gas impinges against the apex of said projections.

6. The solid electrolyte fuel cell of claim 1, wherein each of said at least one plate-shaped solid electrolyte fuel cell element is composed of a plurality of plate-shaped solid electrolyte fuel cell elements, each of which is a laminate formed by a fuel electrode film, a solid electrolyte film and an air electrode film, and side edges of the laminates are connected to each other in a manner that the fuel electrode film of one laminate is connected to an interconnector, which interconnector is insulated from the air electrode film of said one laminate by the solid electrolyte film of said one laminate, and said interconnector is connected to the air electrode film of another laminate while being insulated from the fuel electrode film of said another laminate by the solid electrolyte film of said another laminate.

7. The solid electrolyte fuel cell of claim 1, wherein said gas supply member is hollow, defined by two opposed main surfaces, and includes, on each of said main surfaces, a plurality of protrusions having at their free ends said electric power generating gas supply ducts opening in the recesses.

8. The solid electrolyte fuel cell of claim 7, wherein said plurality of protrusions are provided in a row on each of said main surfaces, each protrusion has a substantially parallelepiped cross-section, the ends of which are tapered off, and each protrusion has at the free end thereof a slit-shaped electric power generating gas supply duct.

9. The solid electrolyte fuel cell of claim 7, wherein said plurality of protrusions are arranged in a row and in parallel with one another.

10. The solid electrolyte fuel cell of claim 7, wherein said plurality of protrusions are provided in rows and columns on each of said main surfaces.

* * * * *